Jan. 13, 1970 E. G. HEDGER 3,489,849

FACSIMILE TEST PATTERN GENERATOR

Filed Aug. 31, 1966 2 Sheets-Sheet 1

INVENTOR.
EARL G. HEDGER

BY [signature]
[signature]

ATTORNEYS

FACSIMILE TEST PATTERN GENERATOR

Filed Aug. 31, 1966

2 Sheets-Sheet 2

INVENTOR.
EARL G. HEDGER
BY [signature]
[signature]
ATTORNEYS

United States Patent Office
3,489,849
Patented Jan. 13, 1970

3,489,849
FACSIMILE TEST PATTERN GENERATOR

Earl G. Hedger, San Diego, Calif., assignor to the United States of America as represented by the Secretary of the Navy Filed Aug. 31, 1966, Ser. No. 576,798
Int. Cl. H04n *1/00, 7/00*
U.S. Cl. 178—5 8 Claims

ABSTRACT OF THE DISCLOSURE

A test pattern generator for an A.M. facsimile system provides signals for testing or adjusting the facsimile recorder. Signals at the operating frequency are fed to a modulator in which they are modulated at an amplitude determined by a selective attenuator. A bistable device periodically completely attenuates the operating frequency signals in the modulator to provide a phasing bar.

The invention described herein may be manufactured and used by or for the Government of the United States of America for governmental purposes without the payment of any royalties thereon or therefor.

This invention is concerned with a test set for testing the operation of a system adapted to reproduce and record a facsimile in response to received signals. More particularly, the present invention is directed to a unique test set for that type of facsimile system which reproduces a facsimile record in response to the amplitude modulation of received signals of a predetermined and substantially fixed frequency.

The concept of the present invention is particularly advantageous in testing, adjusting and adapting the operation of a system for reproducing and recording a facsimile of an image type of information such as may be received from a weather satellite. With the development of space vehicles, a considerable number of so-called weather satellites have been launched into space so as to orbit about the earth observing weather conditions, storms, etc. as may be revealed by cloud formations, the direction and indicated velocities of winds, jet streams, etc., by means of an optical system in the satellite for observing these phenomena.

Such weather satellites may be equipped with an appropriate optical system to view conditions as revealed by cloud formations and configurations. An image of the phenomena viewed through the optical system may be caused to impinge upon a vidicon-type device, for instance. The scene viewed is thus temporarily recorded on the vidicon tube as a charge-density image and at a predetermined time the charge-density image is converted to a sequence of electrical signals by well known scanning techniques; the discrete increments of information as contained in the electrical signals are then transmitted at a predetermined time and at a predetermined signal frequency to a ground station where the image is reproduced by a facsimile system. The facsimile system is, of course, arranged to be responsive to the received signals and more particularly is responsive to the amplitude modulation of a particular predetermined frequency as transmitted by a suitable carrier signal.

For example, several presently operative weather satellites are equipped to observe weather conditions, viewing contiguous segments of a large area above the earth, converting the vidicon charge-density image to electrical signals of an appropriate amplitude modulation at a predetermined frequency for the transmission of those signals back to an earth station at a predetermined point in time. The particular predetermined frequency of amplitude modulation in one such case is 2400 cycles per second.

In this instance, the predetermined frequency remains substantially constant but is amplitude modulated so as to indicate the degree of whiteness, grayness or blackness in the photographic scene viewed, recorded, and transmitted by the weather satellite.

Most ground stations are readily adapted to receive transmitted signals from more than one weather satellite. However, all satellites are not equipped, nor do they as a matter of practical experience, transmit amplitude modulations of the same degree. Moreover, weather conditions can cause a certain degree of distortion or perturbation of the transmitted intelligence. Thus, as will be appreciated by those skilled in the art, a problem arises in accommodating a ground system for reproducing and recording a facsimile to the varying degrees of amplitude modulation as may be contained in the received satellite signals and which amplitude modulation represents variations in photographic density between the whitest whites and the blackest blacks.

The test set of the present invention is conceived for the purpose of providing a means for testing the proper and adequate operation of a system for reproducing and recording a facsimile responsive to such amplitude modulated signals of a predetermined frequency as may be transmitted from a remote station such as a weather satellite and, more particularly, to accommodate the varying degrees of amplitude modulation of such signals of predetermined frequencies as may be received from more than one satellite.

Thus, the test set of the present invention has as a prime object the testing of the operation of a system for reproducing and recording a facsimile.

An equally important object of the present invention is to provide a test set which is adapted to facilitate testing and adjusting the operation of a facsimile recording and reproducing system to accommodate it to different degrees of amplitude modulation, particularly as may be contained in the signals transmitted from several different remote stations.

Another object of the present invention is to provide a test set for testing the operation of a system for reproducing and recording a facsimile which includes a phase bar signal of the type that may be included in a signal transmitted from a remote station for indicating an edge of the transmitted image.

In its fundamental, preferred form the present invention may comprise a test set including a means for generating signals at the predetermined amplitude modulated frequency of the signals received from a remote station during actual operation of the facsimile system. Additionally, there are means provided for dividing the signals of predetermined frequency for producing a second frequency signal. Additional means for dividing the signals of the second frequency are also included for producing signals of a third frequency.

Appropriate attenuator means are connected to a modulator for the signals of predetermined frequency so that those signals may be selectively attenuated at the output terminal of the test set. These signals are provided to reproduce in the facsimile recording system varying degrees of visual image density from white or extremely light gray to a dark gray or black quality. A bistable signal means is connected to the modulator and is responsive to a signal of the previously mentioned third frequency for cyclically cutting off the signals of the predetermined frequency by complete attenuation and is thereafter responsive to a signal of the second frequency for restoring the signals of the predetermined frequency as attenuated by the selective setting of the attenuator. In this manner a phase bar is produced which appears on the facsimile as a vertical white bar of predetermined and constant width. This phase bar is comparable to the edge of the transmitted picture as may be generated in the actual operation of the facsimile recording system when receiving a transmitted photographic scene from a remote station such as a weather satellite, for instance.

Preferably, the attenuator means is graduated in equal increments so as to provide a plurality of degrees of grayness which in a typical instance may be ten different and equally graduated degrees of grayness from an "almost white" representation to an "almost black" representation in a facsimile recorder system.

Thus by use of the present invention, a recording facsimile system may be advantageously employed to receive signals from several weather satellites, for instance, and in each instance be adjusted by means of the test set of the present invention for optimal facsimile image reproduction of the weather scene viewed and transmitted by each weather satellite. In usual operation there is sufficient interval of time between pictures transmitted by different satellites such that the test set may be connected to the recording facsimile system, the system tested for proper operation, and adjusted so as to afford the maximum degree of useful and significant information in the reproduced facsimile.

These and other features, advantages and objects of the present invention will be better understood from the following description of an embodiment of the present invention as illustrated in the associated drawings and the scope of the invention will be pointed out more particularly in the appended claims.

Figure 1:
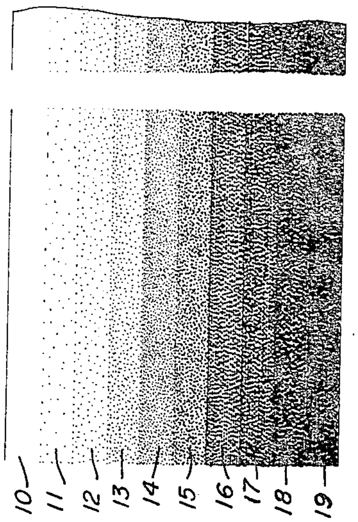
FIG. 1 is a graphic illustration of the type of test pattern produced on a facsimile recorder by the test set of the present invention.

Referring now to FIG. 1, there is seen a graphic illustration typical of the pattern which may be generated for purposes of test and adjustment of a facsimile recorder system. As was previously mentioned, in image representations transmitted from weather satellites, for example, the receiving station must include a capability of facsimile reproduction of the photographic scene viewed by the weather satellite. In order to be of full value in assessing weather conditions and predicting the changes in weather storms, movement of storm centers, etc., a reproduced facsimile must depict the disposition of cloud cover, storm center, and other atmospheric phenomena with the greatest possible visual and optical accuracy. As appreciated by those knowledgeable in the facsimile art, the proper contrast of tones between the extreme ranges of the whitest white and the blackest black must be carefully and accurately adjusted in the facsimile reproduction system to attain the desired accurate image facsimile results. A typical ground station receiving such transmitted information may receive optically viewed images from two or more sources; multiple sources may transmit different degrees of modulation and therefore will produce different degrees of contrast in the reproduced facsimiles unless appropriate tests and adjustments of the facsimile reproducing system are made prior to the reception of each different degree of modulation of the transmitted intelligence received from the weather satellite.

The present invention provides a highly desirable means of accomplishing such tests and adjustments by providing signal inputs to a facsimile recorder system which cause the facsimile recorder to produce a pattern such as that shown in FIG. 1 which graphically illustrates and confirms the proper operation of the system through the test pattern comprising ten shades of gray varying from the lightest shade of gray, i.e. white, through varying degrees of gray to a near black or maximum degree of darkness.

As illustrated in FIG. 1, the test set of the present invention causes the facsimile recorder to produce a first segment 10 which is the lightest shade of gray or virtually white. This result is produced by an unmodulated or full strength signal such as might be caused, for instance, by a weather satellite viewing a bright portion within a very white cloud cover in a particular area. In ten successive and equal degrees, ten segments of varying shades of gray are produced to test and confirm the proper operation of the facsimile recorder system.

Thus, ten percent modulation is depicted by the segment 11, twenty percent modulation is depicted by the segment 12, thirty percent modulation depicted by the segment 13, forty percent modulation depicted by the segment 14, fifty percent modulation depicted by the segment 15, sixty percent modulation depicted by the segment 16, seventy percent depicted by the segment 17, eighty percent modulation depicted by the segment 18 and ninety percent modulation depicted by the segment 19.

It will be appreciated by those skilled in the art, that by reason of the test pattern which is made possible through the use of the present invention, a facsimile recorder may be properly adjusted so as to assure the most desirable result in reproducing image intelligence received from a remote station. If, for instance, the segment 10 were to have a darker degree of grayness than that illustrated in FIG. 1, the facsimile recorder could be appropriately adjusted to produce a white segment responsive to a lesser modulation.

Similarly, if the degrees of grayness were not properly graduated in accordance with the most favorable operation of the facsimile recorder, proper adjustment to attain the most desirable degrees of grayness from a near white to a near black, as illustrated in FIG. 1, could be readily made before the expected transmission were received. Therefore, a much more accurately reproduced facsimile of the original scene viewed by the remote station, such as a weather satellite, is assured by pre-testing and appropriate adjustment.

Figure 2:
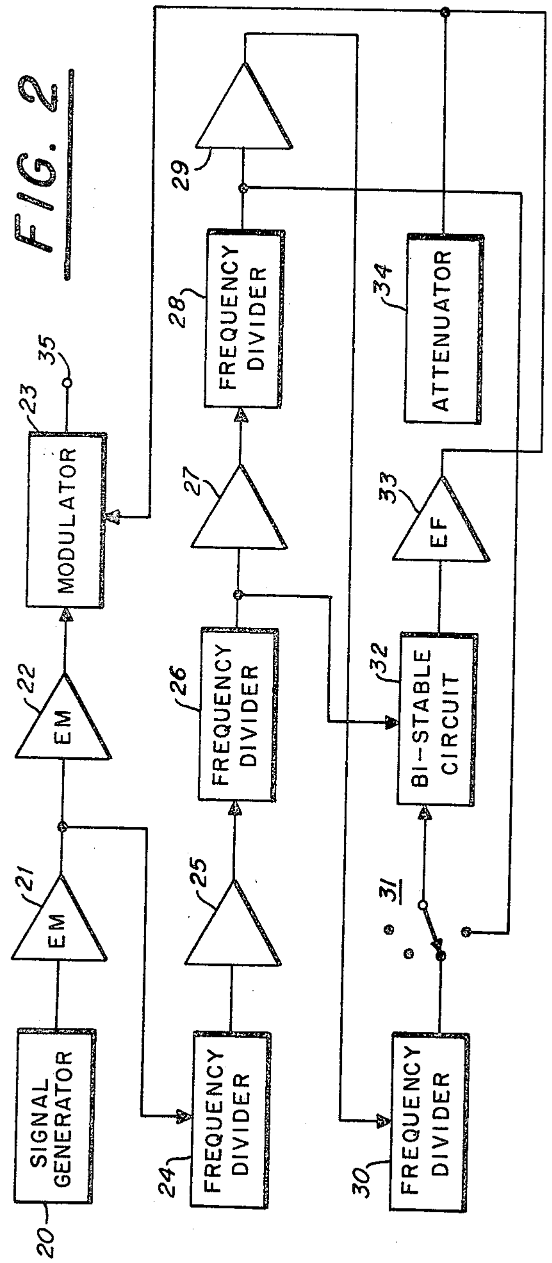
FIG. 2 is a schematic block diagram of a preferred embodiment of the present invention.

FIG. 2 illustrates a schematic block diagram of an embodiment of the present invention. In FIG. 2 a signal generator 20 is provided to develop a signal of a desired predetermined frequency which is fed to an emitter follower 21. The emitter follower 21 is substantially an impedance matching device and provides two identical outputs, one of which is fed to an emitter follower 22 which, in turn, has its output connected to a modulator 23 to produce the ultimate output of the system at an output terminal 35.

The same signal also undergoes multiple frequency divisions. The second output of the emitter follower 21 is fed to a frequency divider 24 where the frequency of the originally generated signal produced by signal generator 20 is divided by a desired amount to produce a sub-harmonic frequency. The output of the frequency divider 24 is appropriately amplified in an amplifier 25 which also provides isolation from another frequency divider 26, where the sub-harmonic frequency produced by frequency divider 24 is again divided to provide a further sub-harmonic frequency of the original frequency generated by signal generator 20.

The output of frequency divider 26 is again amplified by an appropriate amplifier 27 which also provides an isolation means between frequency divider 26 and another frequency divider 28, where the sub-harmonic frequency developed by frequency divider 26 undergoes another frequency division to produce a still lower sub-harmonic frequency. This sub-harmonic frequency is fed to an isolation amplifier 29 which provides an output for another frequency divider 30 wherein the sub-harmonic frequency produced by frequency divider 28 is again divided in frequency to produce a further sub-harmonic of the originally generated signal produced by signal generator 20.

The output of the frequency divider 30 is connected to a switch arrangement 31 which also has a terminal connected to receive a signal from the frequency divider 28. It will be recalled that this signal is the third sub-harmonic frequency produced by the three frequency divisions. A bistable circuit 32 is arranged to receive one output from frequency divider 26 and its other output through the switch means 31 as connected to the frequency divider 30. Thus, it is connected to receive two signals of two different frequencies which control its response in a manner that will be described more fully hereinafter.

The output of the bistable circuit 32 is connected to provide the input to an emitter follower 33 which in turn operates as an impedance matching device providing the input to an attenuator 34. The output of the attenuator 34 is connected to provide the second input to the modulator 23 which produces the ultimate output of the test set at the output terminal 35.

Accordingly, as depicted in the functional block diagram described above, the present invention in its preferred form basically comprises a means for testing the operation of a system for reproducing and recording a facsimile image responsive to the amplitude modulation of signals of a predetermined frequency and includes means for generating signals at a predetermined frequency, multiple means for dividing the signals of predetermined frequency to produce second and third frequencies at least, and attenuator means for selectively attenuating the signals of predetermined frequency at the output terminal of the test set by a desired and variable amount. Additionally, a bistable signal means is connected to the attenuator means and is also responsive to signals of the second and third frequencies derived from the fundamental predetermined frequency so as to cut off the attenuator signals in response to the third frequency and restore the attenuated signals in response to the second frequency.

The bistable operation of cutting off the attenuated frequency and then restoring it at predetermined times produces what is known in the art as a "phasing bar" as depicted by the vertical bar illustrated on the right hand side of FIG. 1. This phasing bar is comparable to the edge of a facsimile picture which is produced in the actual operation of reproduction of pictorial scenes transmitted from a remote station and such phasing bar confirms the the proper operation of the system in that it illustrates graphically that the edge of the picture will be cut off in a straight vertical edge and not produce a skewed image.

Figure 3:
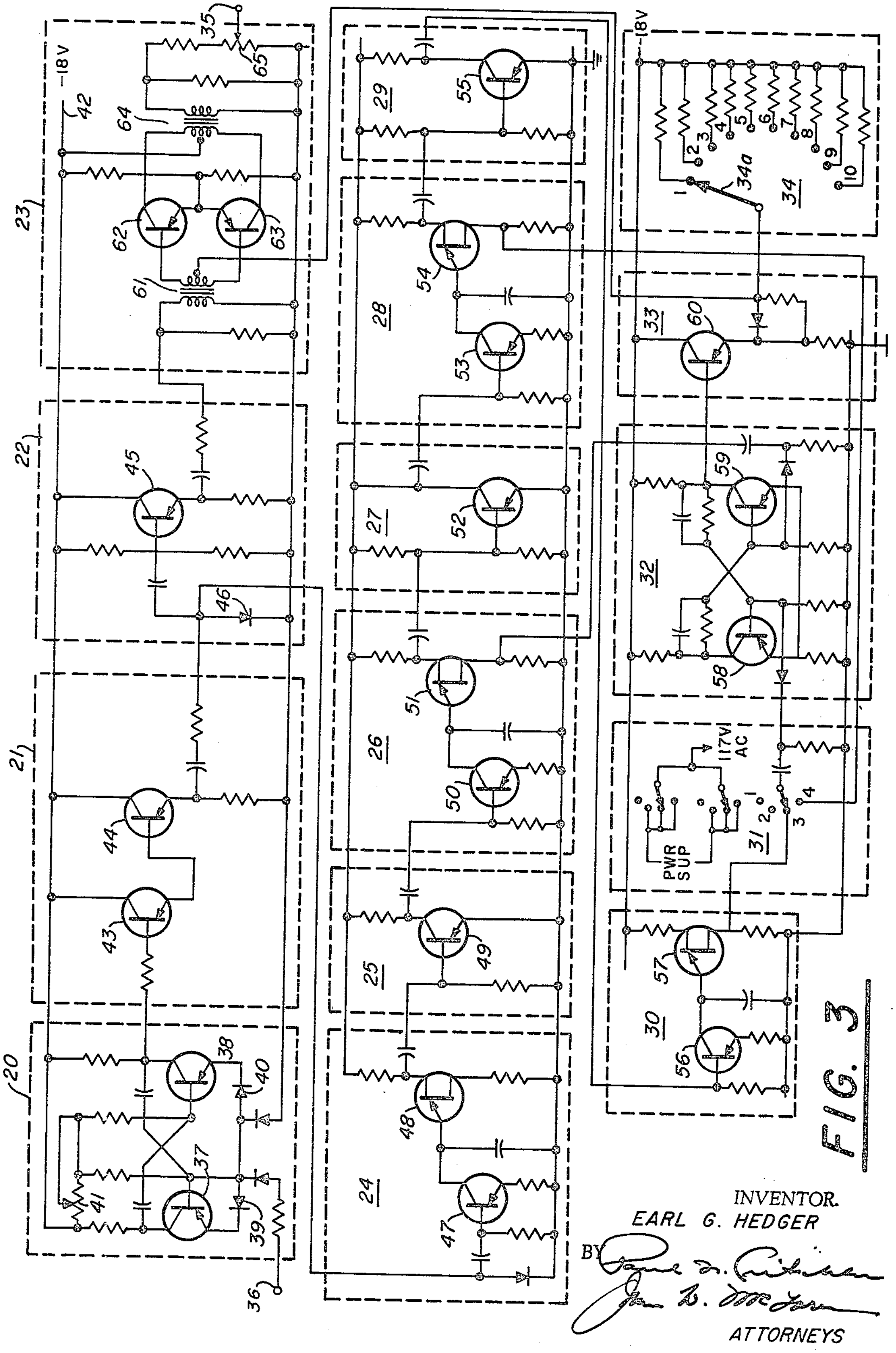
FIG. 3 is a schematic wiring diagram illustrating in detail the circuitry of the embodiment of the present invention illustrated by functional block diagram of FIG. 1.

Referring now to FIG. 3, there is shown a detailed schematic wiring diagram of the embodiment of the present invention which was functionally depicted in the block diagram of FIG. 2. In FIG. 3 major elements of the configuration are indicated by the circuitry contained within the dash line blocks and identified by the same numerical designations as in FIG. 2.

An input terminal 36 is connected to the signal generator 20 which is substantially a transistorized multivibrator type of signal generator comprising two transistors 37 and 38 together with the diodes 39 and 40. The transistors 37 and 38 may be of the 2N1132 type, while the diodes 39 and 40 may be of the 1N458 type. A variable resistor 41 connected in circuit between a source of potential 42 and the two transistors 37 and 38 provides a means for selectively adjusting the frequency of the output signal of the multivibrator circuit 20 as may be desired.

The output of the multivibrator circuit 20 is connected to an impedance matching arrangement comprising a circuit of the Darlington configuration 21 which consists of two transistors 43 and 44 connected in a cascaded emitter follower arrangement. The transistors 43 and 44 may also be of the 2N1132 type and they produce an output which is capacitively coupled to a frequency divider 22 as arranged in appropriate circuitry including the transistor 45. A diode 46 operates as a clipper to control the maximum amplitude of the signal fed to the emitter follower circuit 22 of the transistor 45.

The output of the Darlington circuit 21 is also connected to provide the input to a frequency divider 24 comprising a transistor 47 of the 2N1132 type and a unijunction transistor 48 of the 2N491 type. The frequency divider 24 operates in the particular embodiment of FIG. 3 to divide the received frequency input by a factor of five. In a typical operation the predetermined frequency generated by the signal generator may be 2400 cycles per second so that a frequency division by five accomplished by the frequency divider 24 will produce an output signal of 480 cycles per second. The divided signal is fed to an isolation amplifier 25 comprising the transistor 49 which may be of the 2N1305 type.

The amplified signal produced by the transistor 49 is fed to another frequency divider 26 which comprises a transistor 50 of the 2N1132 type and a unijunction transistor 51 of the 2N491 type. The particular frequency divider 26 operates in the embodiment of FIG. 3 to divide its received frequency by a factor of six. Since its input signal is received at a frequency of 480 cycles per second, the division by a factor of six produces an output signal at a frequency of 80 cycles per second.

The output signal produced by frequency divider 26 is connected to an isolation amplifier 27 comprising a transistor 52 of the 2N1305 type which appropriately amplifies its received signal to provide an input to the next stage of the circuitry of the system and also performs the function of isolating the signal from the frequency divider 26. The frequency divider 26 is also connected to provide one of two input signals to a bistable signal device 32 as shown in FIG. 3 which operates in a manner to be explained more fully hereinafter.

The signal produced by the isolation amplifier 27 is connected to another frequency divider 28 which comprises a transistor 53 of the 2N1132 type and a unijunction transistor 54 of the 2N491 type appropriately connected with circuit elements to produce a frequency dividing operation by a factor of five. Thus, the signal received at frequency divider 28, which has a frequency of 80 cycles per second, is divided by five to produce an output signal at a frequency of 16 cycles per second. This output signal is fed to an isolation amplifier 29 comprising the transistor 55 of the 2N1305 type which in turn connects its amplifier output to a final frequency divider 30.

The frequency divider 30 comprises a transistor 56 of the 2N1132 type and a unijunction transistor 57 of the 2N491 type appropriately arranged and connected to produce frequency division by a factor of four. The signal impressed upon the frequency divider 30, it will be recalled, is of a frequency of 16 cycles per second. Accordingly, the frequency division by a factor of four, as performed by the frequency divider 30, produces an output signal at a frequency of 4 cycles per second. This latter output signal at 4 cycles per second is connectable through a switch means 31 as the second input to a bistable signal device which may be of the multivibrator type comprising two transistors 58 and 59 of the 2N1132 type, as shown in FIG. 3, appropriately arranged and connected to produce bistable operation.

The output of frequency divider 30 at 4 cycles per second, which is connected as one of the inputs to the bistable circuit device 32, is operative to provide a bias to the center tap at the secondary winding of transformer 61 to cut off the transistors 62 and 63 and thereby prevent the output of an attenuated signal as generated in normal operation under variable control of the attenuator 34 by a variable bias impressed upon the transistors 62 and 63 of the modulator 23 to produce the ultimate output of the test set at the output terminal 35. The bistable device 32 remains in its cut-off condition until it receives an 80 cycle per second signal at a predetermined time increment after the 4 cycle per second signal by reason of the frequency division operations previously described. The 80 cycle per second signal received from frequency divider 26 is operative to restore the attenuated signal as determined by the amount of attenuation from the attenuator 34 impressed upon the modulator 23 for generating the output produced at the output terminal 35. This operation provides a cyclic cut-off period of approximately 12.5 milliseconds during each line, each of which may be of the order of 250 milliseconds long in time duration.

An emitter follower type of circuit 33 comprising a transistor of the 2N1132 type, as shown at 60, provides an impedance matching arrangement between the bistable signal device 32 and the attenuator 34 which comprises a switch means 34*a* and a multiplicity of approximately arranged resistive elements connected to a potential source which may, for instance, be −18 volts as shown in FIG. 3.

By positioning the switch 34*a*, a varying potential is connected to the switch means in accordance with the amount of resistance between the potential source and the variable tap of the switch. The selectively determined potential is connected to the center of the secondary winding of a transformer 61 of the modulator 23. A selectively variable bias is thus impressed upon the transistor 62 and 63 to control the amplitude of modulation of the predetermined frequency signal produced by the signal generator 20 and inductively coupled into the modulator 23 through the primary and secondary windings of the transformer 61. In this instance the predetermined frequency was described as being 2400 cycles per second. The two signals thus impressed upon the transformer 61 of the modulator 23 provide the inputs to a push-pull arrangement of an amplification stage comprising the transistors 62 and 63 which may be of the 2N1132 type.

One of the inputs to the modulator is at 2400 cycles per second and of constant frequency, while the other signal is a selectively variable D.C. bias as determined by the disposition of the variable tap 34*a* of attenuator 34 and/or the actuation of the bistable circuit 32 to cause complete attenuation in the manner previously described.

In a typical facsimile system each line may be of the order of 250 milliseconds long in time duration and a typical picture as transmitted from a satellite, for example, and may comprise a number of lines of the order of 800. Accordingly, a complete picture would take about 200 seconds to be reproduced by the facsimile system. Therefore, it is quite possible and generally desirable that the attenuator 34 be operated by manual adjustment of the variable tap 34*a* to produce ten degrees of modulation as illustrated in FIG. 1, each of which may be of the duration of 20 seconds.

The common output of the push-pull transistor 62 and 63 provides the input to a primary winding of a transformer 64 which develops the signal at the ultimate output terminal 35 of the test set. An appropriate variable resistor 65 is provided at the output terminal 35 to afford a means of varying the amplitude of all degrees of attenuated signals uniformly as may be desired.

Thus, it will be seen that the present invention provides a source of signals at a desired predetermined frequency, which signal is arranged to be appropriately attenuated to produce varying degrees of contrast in a reproduction generated by a facsimile recorder. In accordance with the concept of the present invention, the predetermined frequency is divided down by predetermined amounts to produce at least second and third frequencies which provide the controlling inputs to a bistable circuit. The bistable circuit is responsive to the second and third frequencies to cause attenuation of the signal of predetermined frequency to a point of cut off and then restore, respectively, the attenuated signal at synchronous times in the operation of the scan performed by the facsimile recorder. Most such facsimile recorders are arranged to be synchronously operative in accordance with the frequency of the input modulation signal. Accordingly, should the frequency of the signal generated by the signal generator 20 vary slightly, the operation of the facsimile recorder will respond by varying in a like sense and by a commensurate amount. As a result, the frequency divisions generating the second and third frequencies will be produced at proportionately different times of displacement with respect to the synchronous operation of the facsimile recorder so that the phasing bar produced by the operation of the bistable signal device in cutting off and restoring the attenuated signal is always the same absolute width and remains vertically aligned, as shown in FIG. 1.

This is a most important feature of the concept of the present invention because it eliminates the need for a highly accurate frequency source as was common with many test sets of the prior art. However, the test set of the present invention is arranged and designed with the contemplation that an external synchronizing system may be connected to the multivibrator type of signal generator 20 at the input terminal 26 so as to pull that signal generator 20 into a desired synchronism.

It will be apparent to those skilled in the art that the concept of the present invention provides a means for accurately, conveniently and precisely adjusting the response and operation of a facsimile recorder prior to the reception of intelligence information from a remote station such as a weather satellite. Accordingly, the test set of the present invention enables a single fixed station to operate efficiently and accurately in the reception and reproduction of pictorial depictions of weather conditions such as cloud formations, etc., as received from a plurality of remote stations such as orbiting weather satellites notwithstanding that the operative characteristics of such signal sources may vary considerably.

Obviously, many modifications and variations of the present invention are possible in the light of the above teachings. It is therefore to be understood that within the scope of the appended claims the invention may be practiced otherwise than as specifically described.

What is claimed is:

1. A test set for testing the operation of a system for reproducing and recording a facsimile responsive to the amplitude modulation of signals of a predetermined frequency comprising;

means for generating signals at said predetermined frequency;

means for dividing said signals of predetermined frequency for producing signals of a second frequency;

means for further dividing said signals of a second frequency for producing signals of a third frequency;

attenuator means for selectively generating attenuation signals of different amplitudes as desired;

modulator means connected to receive said signals at said predetermined frequency and responsive for controlling the amplitude of said signals of predetermined frequency as a function of the amplitude of said attenuation signals; and bistable signal means responsive to a signal of said third frequency for developing an output signal for cutting off said signals of predetermined frequency by complete attenuation, and responsive to a signal of said second frequency for restoring said signals of predetermined frequency having an amplitude as a function of the amplitude of said attenuation signals.

2. A test set as claimed in claim 1 wherein said second and third frequencies are sub-harmonics of said predetermined frequency.

3. A test set as claimed in claim 1 wherein said means for producing said second and third frequencies comprise cascaded frequency dividers.

4. A test set as claimed in claim 1 and including means for producing signals of said predetermined frequency at a constant amplitude.

5. A test set as claimed in claim 1 wherein said attenuator means includes a plurality of discrete steps of attenuation.

6. A test set as claimed in claim 5 wherein said plurality of discrete steps of attenuation produce output signals selectively attenuated by the same amount between successive steps.

7. A test as claimed in claim 1 wherein said bistable switch means is cyclically operative in synchronism with said predetermined frequency signal.

8. A test set as claimed in claim 1 wherein said means for generating signals at said predetermined frequency is connectable for synchronous operation with an external signal means.

References Cited

UNITED STATES PATENTS 2,978,540 4/1961 Coate et al. ---------- 178—7.5
3,027,420 3/1962 Schaffer et al. ----- 328—188 X

FOREIGN PATENTS 916,629 1/1963 Great Britain.

RICHARD MURRAY, Primary Examiner
R. K. ECKERT, Jr., Assistant Examiner

U.S. Cl. X.R.

178—6; 328—188, 206